Sept. 1, 1970  R. E. GEIGER ET AL  3,526,388

BALANCING HOIST

Filed June 6, 1968  5 Sheets-Sheet 1

FIG. I

INVENTORS
ROBERT EUGENE GEIGER
OTMAR M. ULBING

AGENT

INVENTORS
ROBERT EUGENE GEIGER
OTMAR M. ULBING

AGENT

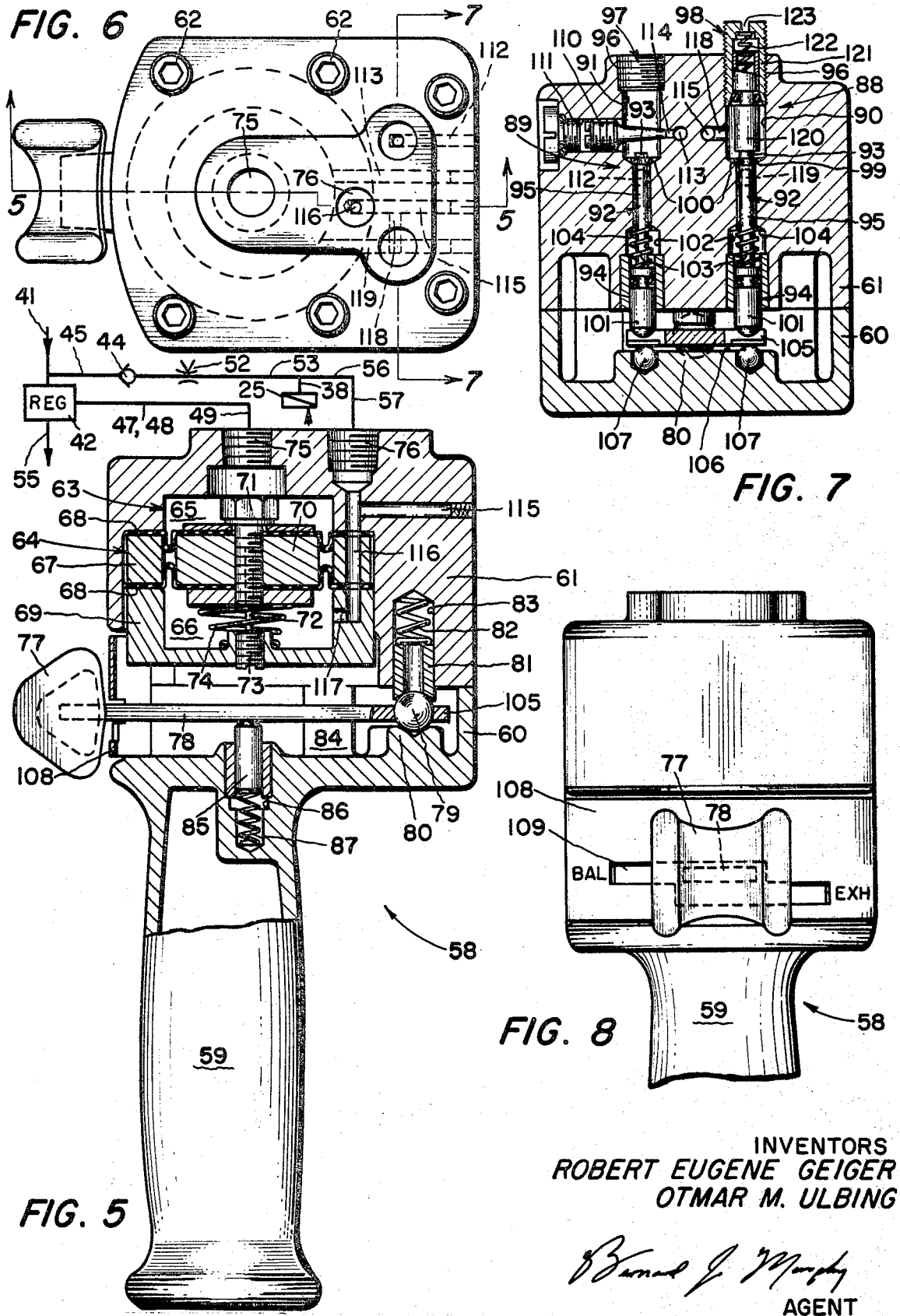

United States Patent Office 3,526,388
Patented Sept. 1, 1970

3,526,388
BALANCING HOIST
Robert Eugene Geiger, Sayre, Pa., and Otmar M. Ulbing, Berkshire, N.Y., assignors to Ingersoll-Rand Company, New York, N.Y., a corporation of New Jersey
Filed June 6, 1968, Ser. No. 734,987
Int. Cl. B66d 1/48
U.S. Cl. 254—168                                12 Claims

ABSTRACT OF THE DISCLOSURE

A balancing hoist having a load sensing diaphragm and a pendant control cooperative for automatically sensing the weight of the hoist-carried workload and automatically adjusting the hoist balancing system to balance the sensed weight.

---

This invention relates to hoists and in particular to pneumatic hoists having means for balancing the weight of the workload.

Prior art pneumatic hoists have control means for balancing workloads within given weight ranges. These hoists provide means accessible to the operator for his adjustment of the balancing circuitry to accommodate any weight in the range. Accordingly, for a weight range extending from a value of N to $N+X$, a needle valve, or some similar device, is customarily provisioned for adjustment to cause the hoist to balance workload weights of N, $N+X$, and weights graduated therebetween. Unless the operator makes the adjustment, such a hoist set for a weight approximating N will fail to balance a weight of $N+X$, and conversely, a hoist set for a weight approximating $N+X$ will allow a workload weight of N to "creep" upwardly—or even rise rapidly, depending upon the weight range involved and hoist power and sensitivity.

Balancing hoists are known which have dual-range control means. In these, the hoist can be readily set to balance a weight of N or $N+X$. However, there still remains the necessity to perform an adjustment to properly balance weights graduated therebetween.

It is an object of this invention, then, to provide a balancing hoist which automatically senses the workload weight and automatically adjusts the balancing means to the sensed weight.

Features of this invention comprise the use in a balancing hoist of a load sensing diaphragm as a pressure-reactant and relieving device cooperative with a control pendant to balance any workload within the range of the hoist.

The aforementioned and further objects and features of this invention will become more apparent by reference to the following description taken in conjunction with the accompanying figures in which:

FIG. 5 is a side elevation view, in cross-section, of the novel pendant used to control the hoist, in association with a schematic of the pneumatic piping, taken along section 5—5 of FIG. 6;

FIG. 6 is a plan view of the novel control pendant of FIG. 5;

FIG. 7 is a vertical cross-section of the pendant taken along section 7—7 of FIG. 6; and FIG. 8 is a front elevational view of the pendant.

Figure 1:
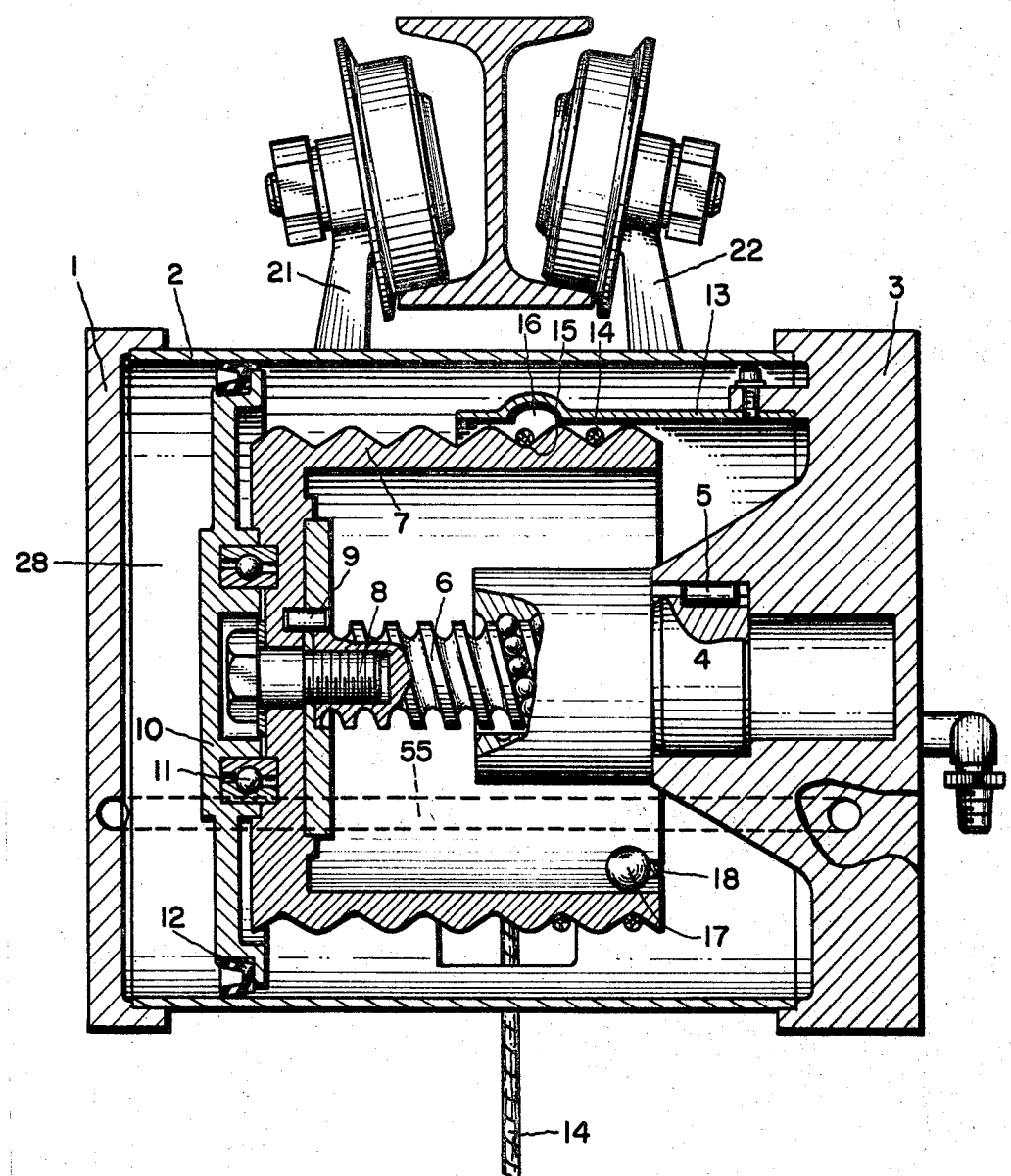
FIG. 1 is a cross-sectional, longitudinal view of the hoist according to the invention less a portion of the trolley support structure.

In FIG. 1 index number, 1 is a piston side end cap, 2 a cylindrical member, and 3 a control side end cap. The control side end cap carries a ball nut 4 which is keyed against rotation by a keying pin 5. A ball screw 6 turns in the ball nut 4 and supports a cable drum 7 which is held by a bolt 8 and restrained against rotation by a pin 9. A piston 10 acts upon the drum-nut assembly through a thrust bearing 11.

Packing 12 seals the piston 10 against the cylinder 2. A cable shield 13 prevents the cable 14 from jumping out of the drum groove 15, and groove 16 in the shield permits insertion of a ball 17 swedged to the end of the cable 14. This ball 17 is received in slot 18 of the cable drum 7 and anchors the cable 14 to the drum. Cable replacement, therefore, can be made without disassembly of the balancer.

Figure 2:
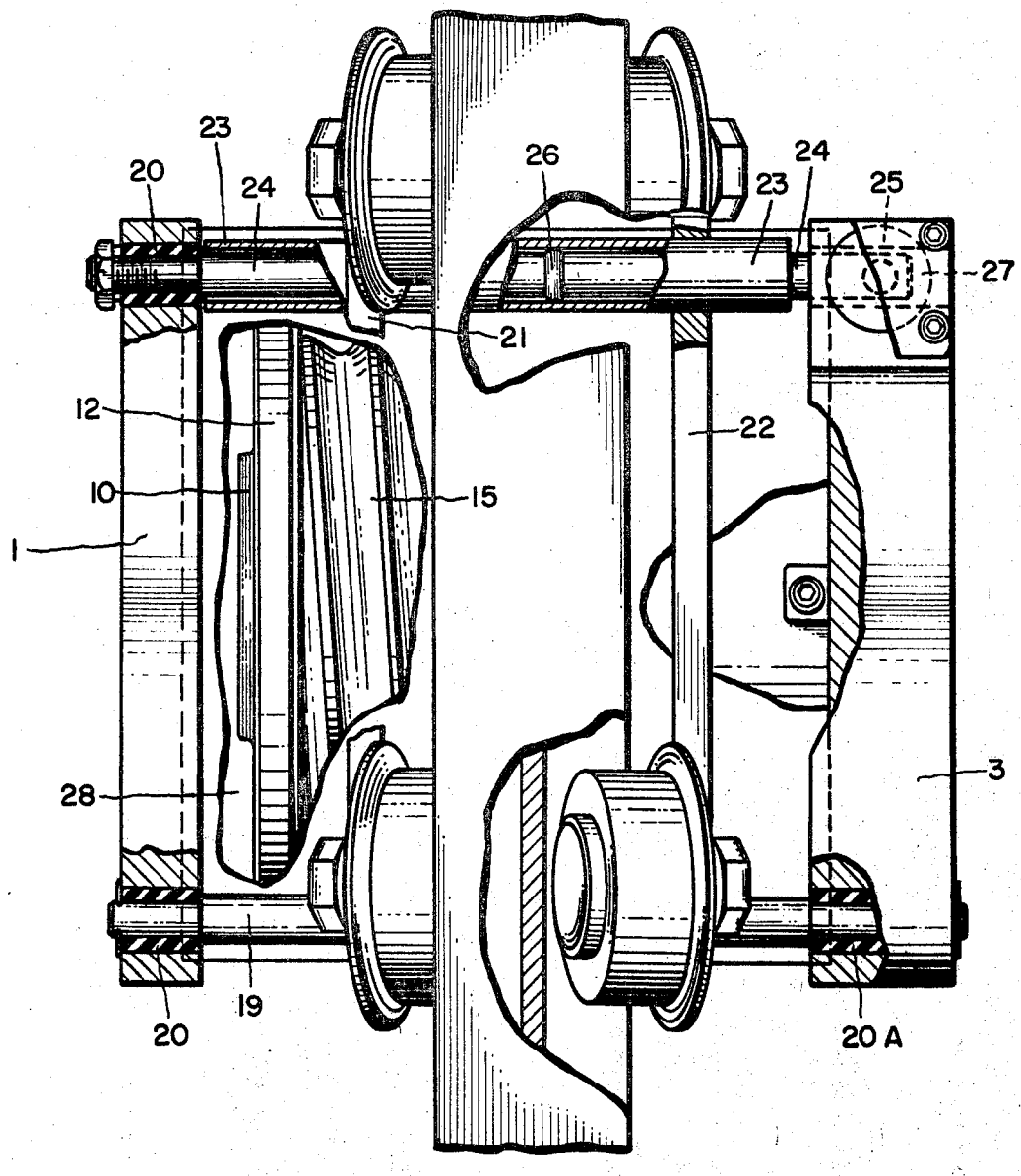
FIG. 2 is a plan view of the novel trolley support structure, having a portion of the trolley beam and hoist housing cut away.
Figure 3A:
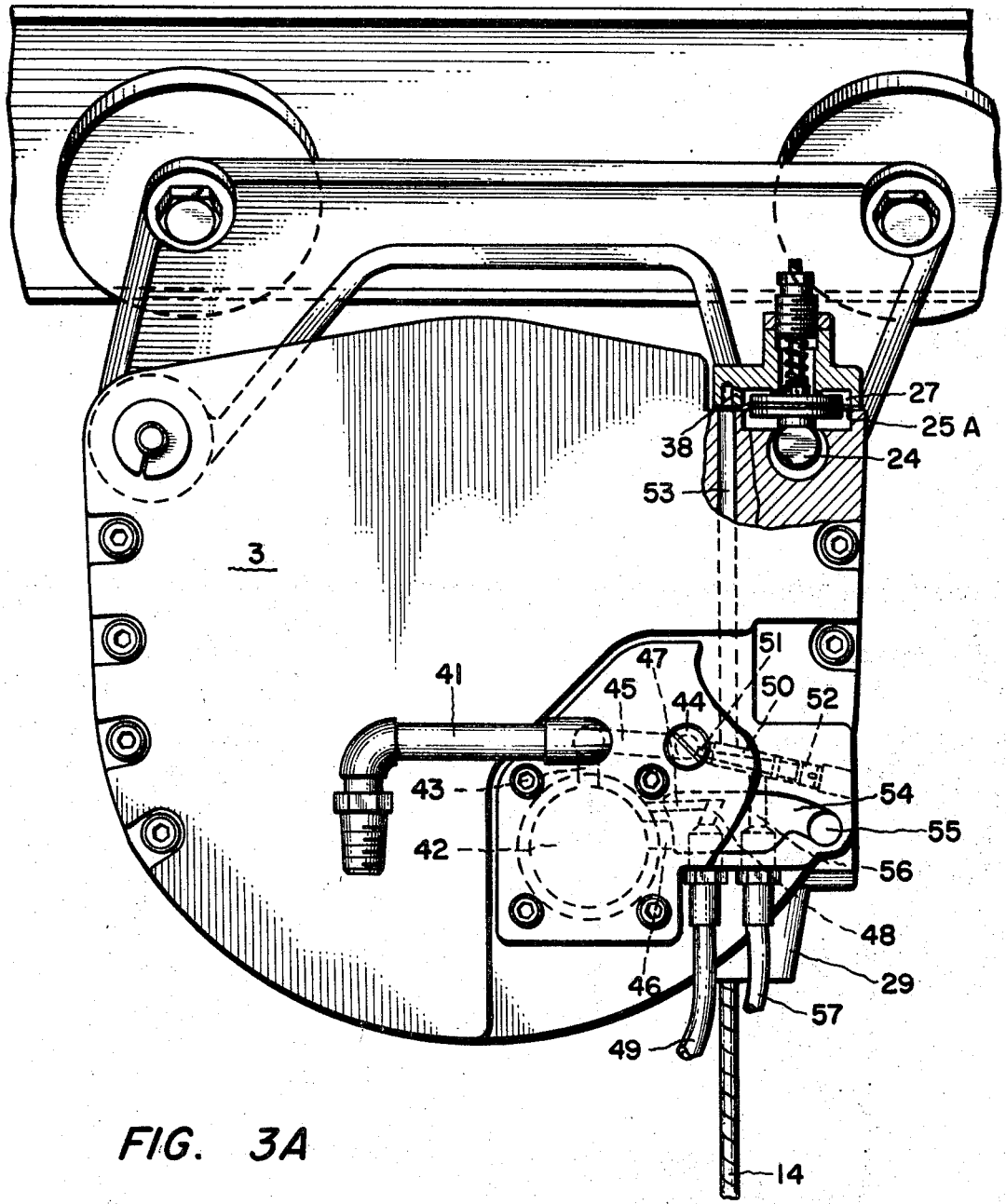
FIG. 3A is an end view, with the hoist control end cap partly in section, showing the pneumatic channeling arrangement.

The support system of the hoist, seen best in FIGS. 2 and 3A consists of a bar 19 supported in rubber bushings 20 carried in end cap 1, and a rubber bushing 20A carried in end cap 3, trolley side plates 21 and 22 held at their one end by bar 19 and at their other end by a tube 23 having a bar 24 contained within. One end of bar 24 is held by a rubber bushing 20 in end cap 1 while the other end rests against a diaphragm assembly 25 disposed within end cap 3. At the approximate center of bar 24 an annular bushing 26 provides a connection and a fulcrum point between the bar 24 and tube 23. A pressure chamber 27 formed within end cap 3, above a diaphragm 25A of assembly 25, is the "weight-sensing" pressure chamber. Pressure chamber 28 (FIGS. 1 and 2) formed between piston 10, end cap 1, and the inner walls of cylindrical member 2, is the "balancing" pressure chamber. That is to say, as will be more fully explained in the following discussion, chamber 27 is provided to facilitate the weight-sensing feature of our invention; chamber 28 is provided to facilitate the balancing of the workload.

A plurality of passageways formed within end cap 3, which passageways are discussed at length in the following text, communicate chambers 27 and 28 with a pressure regulator device, and the priorly mentioned pendant, to balance a workload suspended from cable 14. Finally, a collar 29 fixed to the exterior of cylindrical member 2, in conjunction with a ball (not shown) fastened to the end of the cable 14, serves as a rope guide and up stop.

As constant pneumatic pressure is introduced to chamber 28, the piston 10 is caused to move away from end cap 1. The ball nut 4 being fixed to end cap 3, and ball screw 6 being fixed to drum 7, the drum is caused to move with the piston, and to rotate as ball screw 6 turns in ball nut 4. Accordingly, the cable 14 is reeled in and any workload carried thereon is raised thereby. The manner in which chamber 28 is pressurized to retrieve cable 14—or exhausted, to allow a pay-out of cable 14—is detailed in the following text.

Earlier it was noted that the hoist employs a load sensing diaphragm as a pressure-reactant and pressure-relieving device. This is the diaphragm 25A of diaphragm assembly 25.

Figure 3B:
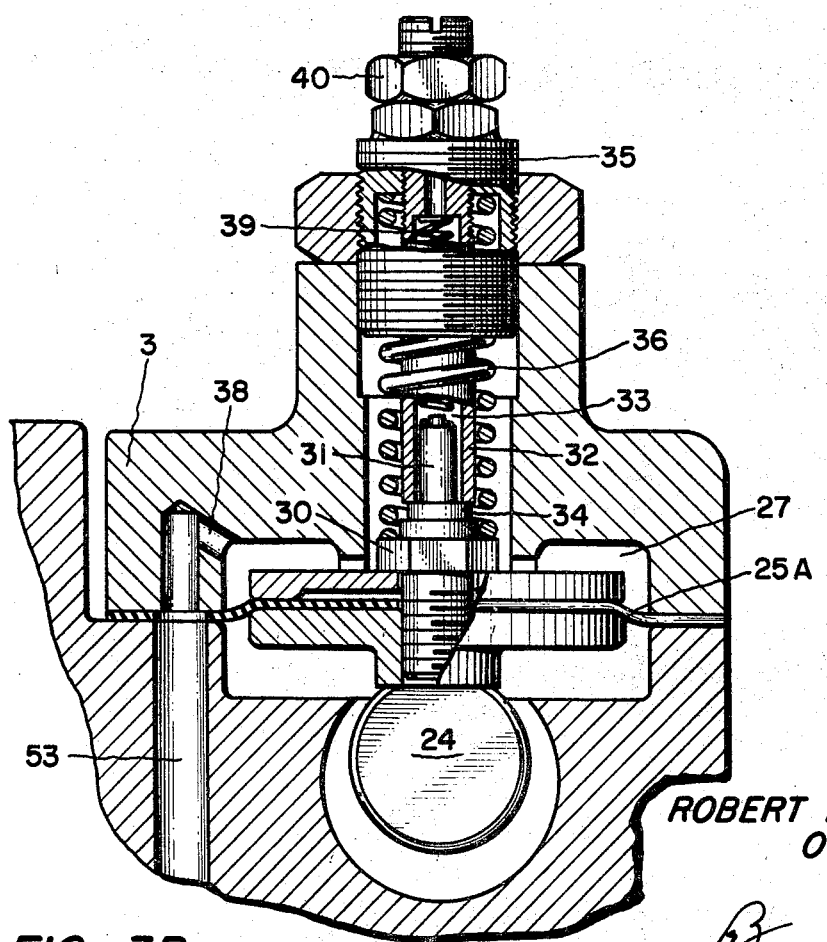
FIG. 3B is an enlarged view of the diaphragm assembly of FIG. 3A shown in vertical cross-section.

By reference to FIG. 3B it is to be noted that chamber 27 defines an area within which the diaphragm 25A can flex. Diaphragm 25A is retained by screw 30 which, as the diaphragm flexes, moves a projecting, valving poppet 31 within a vent tube 32 extending externally from the end cap 3. Vent tube 32 has a vent channel 33 formed therethrough for exhausting chamber 27. An annulus or shoulder 34 integral with the poppet 31 is disposed for seating against the end of tube 32 to seal between chamber 27 and channel 33. A light compression spring 39 is carried within channel 33 and bears against poppet 31 to urge it away from tube 32.

Vent tube 32 is externally threaded, has a drive slot on the extending end, and carries thereabout an internally and externally-threaded adjustment gland 35. Gland 35 is threaded into end cap 3 and has an annular recess therewithin which receives one end of a heavier compression spring 36. The opposite end of spring 36 bears against screw 30 carried by diaphragm 25A. Spring 36 is so adjusted that it carries the portion of the weight of the mechanism which would react against diaphragm 25A so that the diaphragm is only subjected to external (rope) load.

A small port 38 communicates chamber 27 with one passageway of the aforementioned plurality thereof for pressurizing of the chamber in a manner to be described subsequently.

Figure 4A:
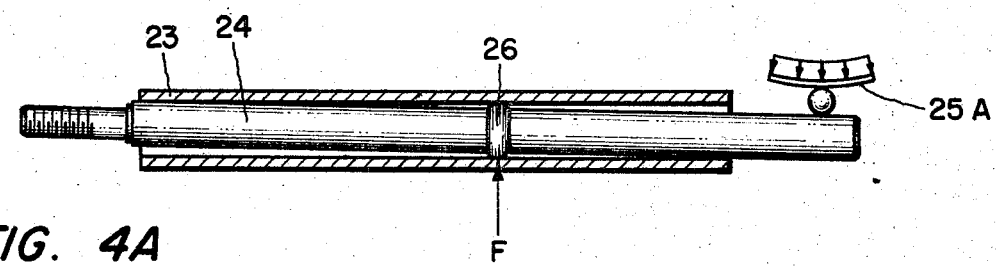
FIGS. 4A and 4B are functional representations of the two modes of operation of the novel trolley support.

In the absence of a workload on cable 14, tube 23 remains unaffected, and maintains its equilibrium relative bar 24 (FIG. 4A). Then, if pneumatic pressure is introduced to chamber 27, diaphragm 25A flexes in response thereto and "levers" bar 24 on the fulcrum F. Accordingly, the pneumatic medium is free to escape via vent channel 33 because the freely pressure-flexed diaphragm 25A withdraws shoulder 34 from the end of the tube 32.

Figure 4B:
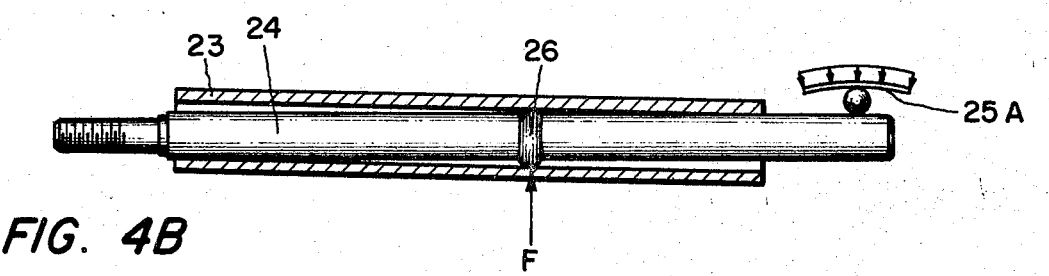

When a workload is carried on cable 14 of a weight equal to a value of N, for instance, tube 23 is pulled down by the weight (FIG. 4B); conversely then, bar 24 is "levered" causing the control side end to bear against the diaphragm 25A maintaining a seal of vent channel 33. With the introduction of pneumatic pressure thereto, via port 38, chamber 27 will pressurize. When the pressure in chamber 27 rises to a level sufficient to flex the diaphragm 25A against the leverage of bar 24, and consequently open the seal of vent channel 33, then diaphragm 25A will have sensed the load N.

Were the load to be of a weight of $N+X$, the bar 24 would be bearing with more force against the diaphragm 25A because the tube 23 would be pulled downwardly with greater force. Thus, it would require a greater pressurization of chamber 27 to overcome bar 24 and open the seal of vent channel 33. So in like manner, workload weights ranging between N and $N+X$ will be sensed by diaphragm 25A, the latter "cracking" the vent channel 33 in reactance to a pressure in chamber 27 which is slightly greater than some given pressure value which is exactly complementary to the load.

Spring 39, as noted earlier, is provided to insure that diaphragm 25A reacts only to the workload. Spring 36 is provided for adjustment of the bias with which diaphragm 25A is urged away from vent channel 33. A locknut 40 provides a means of fixing the adjustment of gland 35 and thereby the bias of spring 36. This would be a factory-set adjustment; vernier adjustment of the diaphragm reactance would remain available to the operator—to establish a slight up or down bias for the hoist if desired, or to set optimum balance. Therefore the drive slot is provided in the externally extending end of vent tube 32 to facilitate such adjustments.

Referring again to FIG. 3A, passageways of the aforementioned plurality thereof are shown as formed in end cap 3.

Constant pneumatic pressure of some given rating is provided to the hoist from an external source (not shown) by input piping 41. The pressurized supply is passed to a regulator 42, by way of passageway 43, and to a check valve 44 by way of passageway 45. The regulator 42 may be any suitable fluid pressure regulator, such as the series 2000 Air Volume Booster manufactured by Fairchild Stratos, West Babylon, N.Y. Such regulators have an input and an output, and a pilot pressure or biasing control port. Accordingly, in this preferred embodiment of our balancing hoist, passageway 43 is the input means; a passageway 46 is the output means; and a further passageway or port 47 provides for the pilot pressure. Port 47 also opens on a passageway 48; this latter passageway communicates with a first pendant control line 49. The fluid pressure further enters a bore 50 via a narrow metering passageway 51 which opens, at either end thereof, on check valve 44 and a needle valve 52. Needle valve 52 meters the flow of fluid between passageway 45 and the load sensing diaphragm because, as can be seen, a further passageway 53 communicates bore 50 with the small port 38.

Passageway 46 opens on area 54. The latter communicates with a passageway 55 which extends parallel with the hoist axis, in cylindrical member 2 (FIG. 1), to open on balance chamber 28. By this arrangement, "live" or input pressure is metered, via needle valve 52, and admitted, via bore 50, and passageway 53, to the weight-sensing chamber 27. Also, the regulated output of regulator 42, via passageway 55, is addressed to the balancing chamber 28 to move piston 10. As both the inputs to chamers 27 and 28 are controlled by needle valve 52, chamber 27 directly, and chamber 28 indirectly via the regulator 42, the needle valve is used, and may be adjusted from time to time, as desired, to vary the rate of pressure rise in chambers 27 and 28. The pressure-rise rate determines the reaction time of the hoist.

A final passageway 56 also communicates with metering passageway 51, via the needle valve bore 50, to receive at the external opening thereof a second pendant control line 57. First pendant control line 49 is the pilot control pressure and exhaust line, and control line 57 is the balance pressure and "lift assist" line.

A description of the pendant 58 (FIG. 5 through 8) and its function follows.

The pendant 58 is provided to communicate with the regulator pilot control pressure, via line 49, and the operating balance pressure of chambers 27 and 28, via line 57. The pendant is a controlling device by means of which the operating balance pressure can be bled off, the pilot control pressure can be vented, and the operating balance pressure can be nullified therein so that a biased diaphragm can be made effective to increase the pilot control pressure. These functions hold the workload at balance, allow the workload to be lowered, and provide an "up assist" or elevation of the workload, respectively.

The pendant 58 has a hand grip 59 integral with a body portion 60. A control portion 61 surmounts the body portion and is secured thereto by a plurality of machine screws 62 (FIG. 6). Control portion 61 has formed therein a volumetric chamber 63 which is divided, by a diaphragm assembly 64, into first and second pressure chambers 65 and 66. The diaphragm assembly 64 consists of a spacing member 67 sandwiched between two diaphragms 68. A cup-shaped retainer 69 secures the diaphragms 68 on the spacing member 67 and within the volumetric chamber 63, nesting in a relieved area of control portion 61 which forms chamber 63. A spacing disc 70 carries a bolt 71 therethrough which has a central, blind bore through the shank thereof; the bore receives a thin, elongate pilot shaft 72 of an adjustable stop member 73. The opposite, headed end of the stop member is slotted and is adjustably, threadedly secured in retainer 69. The shaft 72 is disposed for abutting against the termination of the central blind bore of the bolt shank. A compression spring 74, disposed between spacing disc 70 and retainer 69 urges the spacing disc upwardly (i.e., away from retainer 69).

The control portion 61 has a pilot control pressure port 75, formed in the upper surface (FIG. 6) thereof in direct communication with first pressure chamber 65 which lies immediately therebelow, and a balance pressure port 76, formed in the upper surface thereof in communication with internally formed passages; the dispositions and functions of said passages are detailed in the ensuing text.

A control actuator 77, extending from the pendant, has a flat shaft 78 fixed thereto which extends into the body portion 60. Shaft 78 carries a ball 79 near the end thereof opposite the actuator 77 which sets in a pedestal 80 formed in the body portion 60 and is constrained thereat by a follower 81 biased by a spring 82. The follower 81 and spring 82 are displaceable in a channel 83 formed in control portion 61. Body portion 60 has formed therein a lever area 84 in which shaft 78 can be displaced in horizontal and vertical directions. A follower 85 rides against the lower flat side, i.e., the side facing the hand grip 59, of shaft 78. Follower 85 is displaceable in a drill hole 86 formed in body portion 60 in which there is nested a spring 87. Spring 87 is provisioned for urging follower 85 against the shaft 78 to constrain the shaft upwardly (i.e., toward control portion 61). The actuator 77 is provided to alternately open and close balance and exhaust valves 88 and 89—contained within control portion 61—for elevating the workload or exhausting the balance pressure after the workload has been positioned.

Valves 88 and 89 comprise two valve chambers, balance valve chamber 90 and exhaust valve chamber 91, the two extending vertically within the control portion 61, but disposed to the rear i.e., opposite actuator 77, of volumetric chamber 63. Each valve chamber 90 and 91 confines slidably therewithin a valve member 92 comprising a valve seat section 93 and a lifter section 94 joined by a shaft 95. One end of each valve chamber opens on the top of the pendant 58 in access ports 96. Access port 96 of valve chamber 91 is sealed by a plug 97. Access port 96 of valve chamber 90 receives a poppet assembly 98 which will be described subsequently.

Resilient sealing members 99 are disposed about the ends of shafts 95 to seal valve seats 100, the seats being formed of constructions in the bases of ports 96.

The lifter sections 94 comprise lifters 101 disposed in enlarged areas 102 of chambers 90 and 91, and compression springs 103 interposed between lifters 101 and shoulders 104 formed of constrictions in said chambers. A transverse extension, 105 integral with shaft 78 and, with shaft 78, forming the actuator in a T-shape, is positioned between the lifters 101 and bearing surface 106 formed on pedestal 80. Balls 107 recessed in pedestal 80, and protruding slightly therefrom, provide a surface across which either ends of the extension 105 can slide.

Pendant 58 carries a facing plate 108, covering the forward exposure of area 84, and through a cutout portion 109 thereof the shaft 78 can move. The configuration of the cut-out portion 109, as shown in FIG. 8, is generally, that of a "dog-leg." The balancing "BAL" position of the cut-out 109 will be considered as at the left, and the exhaust "EXH" position of the cut-out 109 to the right. Displacement of the actuator 77 to the left or right, i.e., to "BAL" balance position or "EXH" exhaust position, causes extension 105 to slue, turning on ball 79, causing one end or the other thereof to "knife" between lifter 101 and that ball 107 which is disposed below balance valve chamber 90 or exhaust valve chamber 91, respectively, to broach one or the other of the valve seats 100.

Depending upon the capacity of the hoist, and the fluid pressures involved, the venting of the pilot control pressure via the pendant will be critical. Accordingly, a needle valve member 110 is provided to facilitate an adjustment of this function. Valve member 110 is adjustably threaded in a port 111 formed in the left side of control portion 61. The needle-shaped, metering end of valve member controls the flow of pressured fluid to an exhaust or venting passage.

The referenced venting passage is but one of many such passages formed in control portion 61 and, at this point, the following discussion presents an identification and notes the function of each.

A first, horizontally-extending passage 112 opens on the rear of control portion 61 (i.e., opposite actuator 77) at one end thereof, and opens on valve 89, below seat 100 thereof, at the other end. A second, horizontally-extending passage 113 extends to and is sealed at the rear of control portion 61, but the other end thereof opens on chamber 65. A bore 114, in which the metering end of valve member 110 is confined, communicates passage 113 with chamber 91. Accordingly, when exhaust valve 89 is broached, chamber 65 is vented or exhausted via passage 113, bore 114, through chamber 91 past valve seat 100 therein, and out passage 112 to atmosphere.

A third, horizontally-extending passage 115 has one end extending to the rear of control portion 61 where it is sealed, and the other end terminates immediately below, and in communication with, balance pressure port 76. A vertical passage 116 opens on the juncture of passage 115 and port 76, and extends therefrom in penetration of spacing disc 70 and retainer 69. Passage 116 terminates at a point about midway through the depth of retainer 69 where it throughconnects with a fourth, short, horizontally-extending passage 117. Passage 117 communicates with passage 116 at one end thereof and opens on chamber 66 at its other end.

Passage 115, at a point about midway along its length, joins a transverse passage 118 one end of which opens on passage 115; the other end of passage 118 opens on chamber 90.

Finally, control portion 61 has a fifth, horizontally-extending passage 119 one end of which extends to the rear of control portion 61 where it is sealed. The other end thereof opens on chamber 65 and it further opens, about midway along its length, on the narrowed dimension of chamber 90. Passage 119 opens on chamber 90 below valve seat 100; accordingly, it requires an opening of valve 88 to communicate chamber 65 with balance valve chamber 90.

As pasages 112 and 113 and bore 114 are provisioned to cooperate with valve 89 to exhaust chamber 65, so also do passages 115 through 119 cooperate with valve 88 to communicate the operating balance pressure of chambers 27 and 28 with chambers 65 and 66, and to communicate said pressure with the poppet assembly 98.

Port 75, as noted, communicates the pilot control pressure from line 49 (FIG. 3A) to chamber 65 (FIG. 5). Therein, the pressure operates on diaphragms 68—to allow an expansion of said control pressure—or it is exhausted by the opening of valve 89.

Port 76 communicates the operating balance pressure of chambers 27 and 28 from line 57 to chambers 65 and 66—to nullify or equalize same across diaphragm 68, so that spring 74 will move the diaphragm 68, constrict chamber 65 and enhance the pilot control pressure—or it communicates the balance pressure with the poppet assembly 98 to bleed-off some of said pressure.

The several passages, 112, 113, 115–119, and bore 114, with valves 88 and 89 facilitate this channeling of the pressured fluid.

It remains to discuss the "bleeding" function of poppet assembly 98 (FIG. 7) after which the operation of my novel hoist will be outlined.

Poppet assembly 98 is normally open to communicate both chamber 66 and the balance pressure to atmosphere by way of a bleed passage. The assembly comprises a poppet 120 slidably disposed against a valve seat in a hollow gland 121 adjustably threaded in port 96. A compression spring 122 is disposed between poppet 120 and a constricted termination of gland 121, in which termination is formed a bleed passage 123. Spring 122 urges poppet 120 away from the gland 121 to allow fluid to escape through passage 123. When valve lifter 101 of the balance valve 88 is raised, to open balance valve seat 100, the upper end of valve member 92 forces poppet 120 against the valve seat in gland 121. This seals off the passage 123.

As indicated in FIG. 5, the first pendant control line, pilot pressure control line 49, is coupled to control pressure port 75, and the second pendant control line, balance pressure line 56, is coupled to line pressure port 76. With this proper arrangement, then, the operation of my novel balancing hoist is as follows.

As illustrated in FIGS. 5–8, the actuator 77 is shown positioned between the "BAL" balance and "EXH" exhaust positions. However, when not in use, the actuator 77 of pendant 58 will normally be in the right-hand "EXH" position. Thus, extension 105 will raise the lifter 101 associated with chamber 91 and broach valve seat 100 thereof. Passageway 113, which communicates with chamber 65, vents the latter via needle valve 110 and exhaust passageway 112.

The exhausting of chamber 65 exhausts line 49 in communication therewith, thus, the pilot pressure and the output pressure of regulator 42 (FIG. 3A) are attenuated. The result of this is to de-pressurize chambers 27 and 28, and the cable 14 can be freely payed-out accordingly.

After affixing a workload to cable 14, the operator will place the actuator 77 in the "BAL" or left-hand position. This closes valve 89 and seals off chamber 91. Thus, regulator 42 proceeds to pressurize chambers 27 and 28, and the workload comes to balance in the manner previously described. With the actuator 77 in the "BAL" position, the poppet assembly 98 is also closed. This occurs because extension 105 raises the lifter 101 associated with chamber 90. The raising of lifter 101 opens valve 88 and communicates the balance pressure with chamber 65, via passage 119, and halts the bleeding-off of the pressure via the now closed poppet assembly 98. Accordingly, chambers 65 and 66 are at the same "balance" pressure. The only effective force remaining operative on diaphragms 68 is that of spring 74. Accordingly, spring 74 moves disc 70, upward. As previously mentioned the pilot pressure controlled by diaphragm 25A reaches a level somewhat higher than required to balance the load, thus pressure in chamber 28 will also be higher than balance pressure and the load will rise. When the workload is at a desired height, the operator moves the actuator 77 to a position intermediate the "BAL" and "EXH" positions, i.e., that positioning shown in FIGS. 5–8. Now, the exhaust valve 89 remains closed, and the balance valve 88 is also closed. However, poppet assembly 98 is then open again. Poppet assembly 98 bleeds off chamber 66, via passages 116–118 and chamber 90, and the balance pressure of line 57, via passage 115 and port 76. The pilot pressure in chamber 65 expands, moving the disc 70 against the bias of the spring 74. This movement reduces the output pressure of regulator 42 and pressure in chamber 28 is, as a consequence thereof, reduced. Thus the lifting of the workload stops. The operator can now manipulate the workload without further use of the pendant.

When it is desired to release the workload, the operator moves the actuator 77 to the "EXH" position, and pilot pressure is vented by pendant 58 in the manner previously described.

The instant balancing hoist of our invention manifests a very high-speed operation. On bringing the workload to balance, with the pendant 58 in the "BAL" balance position, the pressurization of pendant control line 49 increases—through the movement of spring 74 against diaphragm assembly 64—at a rapid rate. What occurs is a kind of "overshoot" of the pilot control pressure (at port 47 of regulator 42) and the balancing pressure of balancing chamber 28. It is this overshoot that causes the regulator to further pressurize balancing chamber 28 to balance the load, and begins to accelerate the load upward. The mass—represented by the load weight and its acceleration—is sensed by the diaphragm 25A as a workload of greater weight; it senses a dynamic weight rather than a static weight. Accordingly, the workload will first come to balance, and then proceed to rise. It remains only for the operator to move the actuator 77 to the intermediate position to halt the load at balance in the manner previously described.

When it is desired to raise the workload further, i.e., to provide a "lift assist," the actuator 77 is moved to the "BAL" position again. Then, as pressure addressed to chambers 27 and 28 is no longer being bled off, via poppet assembly 98, it is fully borne by diaphragm 25A. The diaphragm 25A is flexed away from its vent channel 33 again. The overshoot priorly mentioned occurs again; diaphragm assembly 64 moves under the urging of spring 74 again, regulator 42 responds by further pressurizing balancing chamber 28, and the load rises further.

It is a teaching of our disclosure, then, to provide a basic hoist structure with means for automatically sensing the workload weight and balancing the same, additionally providing a control means for said structure operable for causing a "lift assist" to the hoist for elevating the balanced workload and to exhaust the balance chamber to release the workload.

While we have described our invention in connection with a specific embodiment thereof it is to be clearly understood that this is done only by way of example and not as a limitation to the scope of our invention as set forth in the objects thereof and in the appended claims.

We claim:

1. A balancing hoist, comprising:
   a housing having a variable volume balancing chamber therewithin;
   a cable drum rotatably supported within said housing;
   means interposed between said drum and said housing for causing said drum to rotate, to retrieve cable thereon, in response to a change in the volume of said balancing chamber;
   means coupled to said housing for admitting a given supply of pressured fluid thereto, and for introduction of a proportional quantity of said fluid to said balancing chamber to pressurize said chamber in opposition to the weight of a cable-carried workload, pressurization of said chamber being effective to change the volume thereof; and
   means carried by said housing for sensing the weight of such cable-carried workload, said weight sensing means being in communication with said given supply, and having means for automatically venting therefrom a a component of said given supply, to limit the proportion of said proportional quantity, and to inhibit the pressurization of said balancing chamber beyond a given value which is the reciprocal of said opposing weight.

2. A balancing hoist, according to claim 1, further comprising:
   means for automatically bleeding-off said given supply to maintain the pressurization of said balancing chamber only at said given value.

3. A balancing hoist, according to claim 1, further comprising:
   means for attenuating the pressure of fluid admitted to said balancing chamber to allow said drum rotating means to rotate said drum and pay-out cable.

4. A balancing hoist, according to claim 1, further comprising:
   means for pressurizing said balancing chamber beyond said given value, causing said drum rotating mean to retrieve cable and raise said workload.

5. A balancing hoist, comprising:
   a housing having a variable volume balancing chamber therewithin;
   a cable drum rotatably supported within said housing;
   means interposed between said drum and said housing for causing said drum to rotate, to retrieve cable thereon, in response to a change in the volume of said balancing chamber;
   means coupled to said housing for admitting a given supply of pressured fluid thereto, and for introduction of a proportional quantity of said fluid to said balancing chamber to pressurize said chamber in opposition to the weight of a cable-carried workload, pressurization of said chamber being effective to change the volume thereof; and means carried by said housing for sensing the weight of such cable-carried workload, said weight sensing means being in communication with said given supply, and having means for automatically venting therefrom a component of said given supply, to limit the proportion of said proportional quantity, and to inhibit the pressurization of said balancing chamber beyond a given value which is the reciprocal of said opposing weight; and wherein:

said weight sensing means comprise a reactance chamber formed within said housing;

means for venting said reactance chamber;

resilient means subdividing said reactance chamber having means for opening and closing said venting means;

wherein said fluid admitting means include means for admitting fluid to said reactance chamber to urge said resilient means to open said venting means; and further comprising means for causing the weight of said workload to bear against said resilient means to urge said resilient means to close said venting means.

6. A balancing hoist, according to claim 5, wherein:

said weight bearing means comprise trolley members for suspending said housing;

a first rod having either ends thereof fixed in said housing, and an intermediate portion thereof fixed in said members to support one side of said housing;

a second rod having one end thereof fixed in said housing, partially to support the other side of said housing, and the other end thereof disposed within said reactance chamber;

a tube surrounding an intermediate portion of said second rod in spaced relationship therefrom, an intermediate portion of said tube being fixed to said members also partially to support said other side of said housing; and an annulus interposed between said second rod and said tube for causing said rod to pivot thereon, relative to said tube, in response to workload tension on said tube, to cause said second rod to bear against said resilient means.

7. A balancing hoist, according to claim 5, wherein:
said resilient means comprise a diaphragm;

said diaphragm having a non-yielding member in penetration thereof extending to either sides thereof, one extension of said member being disposed for opening and closing said venting means, the other extension of said member being disposed for intercepting and reacting to the weight of said workload brought to bear thereat.

8. A balancing hoist, according to claim 5, further comprising a fluid-pressure regulator device, carried by said housing, for regulating the pressure of fluid admitted to said balancing chamber; and wherein said fluid admitting means comprise conduitry formed in said housing for conducting pressured fluid to said balancing chamber via said device.

9. A balancing hoist, according to claim 8, wherein:

said regulator has inlet and outlet means in communication with said conduitry, and a pilot pressure port which causes said regulator to be responsive to variable pressures at said port for varying the regulated pressured fluid output of said regulator.

10. A balancing hoist, according to claim 5, further comprising:

means for automatically bleeding-off said given supply to maintain the pressurization of said balancing chamber only at said given value.

11. A balancing hoist, according to claim 5, further comprising:

means for attenuating the pressure of fluid admitted to said balancing chamber to allow said drum rotating means to rotate said drum and pay-out cable.

12. A blancing hoist, according to claim 5, further comprising:

means for pressurizing said balancing chamber beyond said given value, causing said drum rotating means to retrieve cable and raise said workload.

References Cited
UNITED STATES PATENTS

| | | | |
|---|---|---|---|
| 3,260,508 | 7/1966 | Powell | 254—168 |
| 3,343,810 | 9/1967 | Parnell | 254—172 |
| 3,384,350 | 5/1968 | Powell | 254—168 |

HARVEY C. HORNSBY, Primary Examiner

U.S. Cl. X.R.

137—625; 212—134; 254—172, 173